US011243355B2

(12) United States Patent
Willner et al.

(10) Patent No.: US 11,243,355 B2
(45) Date of Patent: Feb. 8, 2022

(54) SYSTEMS AND METHODS FOR BUILDING, OPERATING AND CONTROLLING MULTIPLE AMPLIFIERS, REGENERATORS AND TRANSCEIVERS USING SHARED COMMON COMPONENTS

(71) Applicant: LyteLoop Technologies, LLC, Great Neck, NY (US)

(72) Inventors: Alan Eli Willner, Los Angeles, CA (US); Daniel Damaghi, Great Neck, NY (US); Ohad Harlev, Closter, NJ (US); Paul Francis McManamon, Dayton, OH (US); Armand Vedadi-Comte, New York, NY (US); Dipayan Datta Choudhary, Secaucus, NJ (US)

(73) Assignee: LyteLoop Technologies, LLC, Great Neck, NY (US)

( * ) Notice: Subject to any disclaimer, the term of this patent is extended or adjusted under 35 U.S.C. 154(b) by 0 days.

(21) Appl. No.: 16/672,221

(22) Filed: Nov. 1, 2019

(65) Prior Publication Data

US 2020/0166707 A1 May 28, 2020

Related U.S. Application Data

(60) Provisional application No. 62/755,631, filed on Nov. 5, 2018.

(51) Int. Cl.
*G02B 6/28* (2006.01)
*H01S 3/094* (2006.01)
*H01S 3/30* (2006.01)

(52) U.S. Cl.
CPC ...... *G02B 6/2861* (2013.01); *H01S 3/094026* (2013.01); *H01S 3/302* (2013.01)

(58) Field of Classification Search
CPC .................................................. G02B 6/2861
See application file for complete search history.

(56) References Cited

U.S. PATENT DOCUMENTS 3,141,153 A  7/1964 Klein
3,164,809 A  1/1965 Pearce et al.
(Continued)

FOREIGN PATENT DOCUMENTS

CA    2266132 A1    9/2000
EP    0080841 A2    11/1982
(Continued)

OTHER PUBLICATIONS

A. E. Willner, et al., Star Couplers With Gain Using Multiple Erbium-Doped Fibers Pumped With A Single Layer, IEEE Photonics Technology Letters, Mar. 1991, pp. 250-252, vol. 3, No. 3, IEEE Xplore Digital Library, United States.
(Continued)

*Primary Examiner* — Sung H Pak
(74) *Attorney, Agent, or Firm* — Amster, Rothstein & Ebenstein LLP (57) ABSTRACT

A system comprising a recirculating loop configured to store an electromagnetic wave signal, the recirculating loop comprising a transmission medium and a plurality of transceivers configured to introduce the electromagnetic wave signal into the transmission medium and retrieve the electromagnetic wave signal from the transmission medium, and a signal conditioning system comprising a plurality of signal conditioners coupled to the transmission medium, the plurality of signal conditioners configured to amplify or regenerate the electromagnetic wave signal traveling in the transmission medium, one or more pump laser sources, wherein at least one of the one or more pump laser sources is configured to provide a pump laser beam to at least two of the plurality of signal conditioners, and one or more control
(Continued)

circuits for controlling the plurality of signal conditioners, wherein at least one of the one or more control circuits is configured to control and monitor at least two of the plurality of signal conditioners, is disclosed.

50 Claims, 3 Drawing Sheets

(56) References Cited

U.S. PATENT DOCUMENTS

| | | | |
|---|---|---|---|
| 3,229,258 A | 1/1966 | Heibeck et al. |
| 3,277,450 A | 10/1966 | Edson |
| 3,350,697 A | 10/1967 | Hirvela |
| 3,411,142 A | 11/1968 | Lee et al. |
| 4,014,166 A | 3/1977 | Cateora et al. |
| 4,136,929 A | 1/1979 | Suzaki |
| 4,166,212 A | 8/1979 | Judeinstein |
| 4,180,814 A | 12/1979 | Barton |
| 4,359,733 A | 11/1982 | O'Neill |
| 4,455,651 A | 6/1984 | Baran |
| 4,469,397 A | 9/1984 | Shaw et al. |
| 4,473,270 A | 9/1984 | Shaw |
| 4,479,701 A | 10/1984 | Newton et al. |
| 4,586,779 A | 5/1986 | Huignard et al. |
| 4,588,255 A | 5/1986 | Tur et al. |
| 4,652,079 A | 3/1987 | Shaw et al. |
| 4,653,042 A | 3/1987 | d'Auria et al. |
| 4,656,666 A | 4/1987 | Piekenbrock |
| 4,708,421 A | 11/1987 | Desurvire et al. |
| 4,738,503 A | 4/1988 | Desurvire et al. |
| 4,744,083 A | 5/1988 | O'Neill et al. |
| 4,815,804 A | 3/1989 | Desurvire et al. |
| 4,856,862 A | 8/1989 | Passmore et al. |
| 4,877,952 A | 10/1989 | Halemane et al. |
| 4,896,948 A | 1/1990 | Dono et al. |
| 4,923,267 A | 5/1990 | Su |
| 4,974,931 A | 12/1990 | Poole |
| 5,058,060 A | 10/1991 | Su |
| 5,144,322 A | 9/1992 | Gabriel |
| 5,319,482 A | 6/1994 | Tsuchiya et al. |
| 5,335,098 A | 8/1994 | Leyva et al. |
| 5,392,154 A | 2/1995 | Chang et al. |
| 5,438,337 A | 8/1995 | Aguado |
| 5,440,669 A | 8/1995 | Rakuljic et al. |
| 5,533,154 A | 7/1996 | Smith |
| 5,555,127 A | 9/1996 | Abdelkader et al. |
| 5,566,261 A | 10/1996 | Hall et al. |
| 5,602,838 A | 2/1997 | Kartalopoulos |
| 5,740,117 A | 4/1998 | Bona et al. |
| 5,844,700 A | 12/1998 | Jeganathan et al. |
| 5,862,286 A | 1/1999 | Imanishi et al. |
| 5,896,213 A | 4/1999 | Nagahori et al. |
| 5,978,130 A | 11/1999 | Fee et al. |
| 5,991,069 A | 11/1999 | Jander |
| 6,002,916 A | 12/1999 | Lynch |
| 6,035,081 A | 3/2000 | Poustie et al. |
| 6,043,918 A | 3/2000 | Bozzay et al. |
| 6,144,486 A | 11/2000 | Bennett et al. |
| 6,172,926 B1 | 1/2001 | Drayer |
| 6,275,479 B1 | 8/2001 | Snell et al. |
| 6,301,037 B1 | 10/2001 | Fischer et al. |
| 6,304,354 B2 | 10/2001 | Carlson |
| 6,317,095 B1 | 11/2001 | Teshirogi et al. |
| 6,317,232 B1 | 11/2001 | Fee et al. |
| 6,347,099 B1 | 2/2002 | da Silva et al. |
| 6,366,356 B1 | 4/2002 | Brosnan et al. |
| 6,437,890 B1 | 8/2002 | Scheps |
| 6,452,719 B2 | 9/2002 | Kinoshita |
| 6,535,314 B1 | 3/2003 | Mendenhall et al. |
| 6,580,552 B2 | 6/2003 | Welch |
| 6,609,840 B2 | 8/2003 | Chow et al. |
| 6,647,163 B2 | 11/2003 | Song |
| 6,674,754 B1 | 1/2004 | Ofek |
| 6,819,817 B2 | 11/2004 | Kaneko |
| 6,826,335 B1 | 11/2004 | Grudinin et al. |
| 6,839,520 B1 | 1/2005 | Dreischer et al. |
| 6,850,364 B2 | 2/2005 | Xie et al. |
| 6,912,075 B1 | 6/2005 | Ionov et al. |
| 6,917,739 B2 | 7/2005 | Chen |
| 6,930,825 B2 | 8/2005 | Nagel et al. |
| 6,973,271 B2 | 12/2005 | Farmer et al. |
| 7,103,239 B2 | 9/2006 | Kish, Jr. et al. |
| 7,103,280 B1 | 9/2006 | Ionov et al. |
| 7,110,651 B2 | 9/2006 | Golowich et al. |
| 7,149,431 B2 | 12/2006 | Jung et al. |
| 7,167,286 B2 | 1/2007 | Anderson et al. |
| 7,174,067 B2 | 2/2007 | Murshid et al. |
| 7,177,510 B2 | 2/2007 | Ramachandran |
| 7,199,343 B2 | 4/2007 | Mosley |
| 7,235,150 B2 | 6/2007 | Bischel et al. |
| 7,369,085 B1 | 5/2008 | Jacomb-Hood |
| 7,450,618 B2 | 11/2008 | Dantus et al. |
| 7,542,679 B2 | 6/2009 | Price |
| 7,557,365 B2 | 7/2009 | Gorrell et al. |
| 7,729,398 B2 | 6/2010 | Livingston |
| 7,733,930 B2 | 6/2010 | Livingston |
| 7,742,209 B2 | 6/2010 | Curtis et al. |
| 7,742,210 B2 | 6/2010 | Raguin et al. |
| 7,756,169 B2 | 7/2010 | Livingston et al. |
| 7,796,487 B2 | 9/2010 | Chu et al. |
| 7,843,791 B2 | 11/2010 | Kwon et al. |
| 8,036,537 B2 | 10/2011 | Cai |
| 8,232,028 B2 | 7/2012 | Askham |
| 8,305,863 B2 | 11/2012 | Tatsuta et al. |
| 8,417,125 B2 | 4/2013 | Chand et al. |
| 8,532,486 B2 | 9/2013 | Stead et al. |
| 8,582,972 B2 | 11/2013 | Small et al. |
| 8,699,888 B2 | 4/2014 | Scaffardi et al. |
| 8,913,894 B2 | 12/2014 | Coleman et al. |
| 9,077,577 B1 * | 7/2015 | Ashrafi ................ H04L 9/3093 |
| 9,176,280 B2 | 11/2015 | Li et al. |
| 9,503,186 B2 | 11/2016 | Kawanishi et al. |
| 9,570,811 B2 | 2/2017 | Ohshima et al. |
| 9,609,402 B2 | 3/2017 | Long et al. |
| 9,625,878 B2 | 4/2017 | Fontecchio et al. |
| 9,712,239 B2 | 7/2017 | Murshid et al. |
| 9,749,080 B2 | 8/2017 | Lam et al. |
| 9,760,061 B2 | 9/2017 | Ayres et al. |
| 9,812,845 B1 | 11/2017 | Lee et al. |
| 9,843,388 B1 | 12/2017 | Astakhov et al. |
| 9,912,409 B2 | 3/2018 | Jia et al. |
| 9,917,646 B2 | 3/2018 | Turgeon et al. |
| 10,001,603 B2 | 6/2018 | Martinelli |
| 10,073,417 B2 | 9/2018 | Ashrafi et al. |
| 10,084,532 B2 | 9/2018 | Buer et al. |
| 10,103,799 B2 | 10/2018 | Luddy et al. |
| 10,122,456 B2 | 11/2018 | Hreha |
| 10,142,012 B2 | 11/2018 | Welle |
| 10,305,560 B2 | 5/2019 | Adachi et al. |
| 10,312,999 B2 | 6/2019 | Neuman |
| 10,326,526 B2 * | 6/2019 | Ashrafi .............. H04B 10/2507 |
| 10,411,811 B2 | 9/2019 | Willner et al. |
| 10,606,146 B2 | 3/2020 | Heine |
| 10,827,911 B2 | 11/2020 | Ramachandran et al. |
| 2001/0012142 A1 | 8/2001 | Carlson |
| 2002/0075536 A1 | 6/2002 | Cao |
| 2002/0181342 A1 | 12/2002 | Clark |
| 2002/0196488 A1 | 12/2002 | Myers |
| 2003/0007230 A1 | 1/2003 | Kaneko et al. |
| 2003/0128365 A1 | 7/2003 | Strandjord et al. |
| 2003/0219258 A1 | 11/2003 | Ellis et al. |
| 2004/0151428 A1 | 8/2004 | Nikonov |
| 2004/0190845 A1 | 9/2004 | Chen |
| 2004/0246583 A1 | 12/2004 | Mueller et al. |
| 2005/0084801 A1 | 4/2005 | El-Hafidi et al. |
| 2006/0173983 A1 | 8/2006 | Naito et al. |
| 2007/0072546 A1 | 3/2007 | Jenkin et al. |
| 2007/0081785 A1 | 4/2007 | Hays |
| 2007/0098052 A1 | 5/2007 | Budic |
| 2008/0002981 A1 | 1/2008 | Valley et al. |
| 2008/0008076 A1 | 6/2008 | Raguin et al. |
| 2008/0144164 A1 | 6/2008 | Metivier |
| 2008/0239428 A1 | 10/2008 | Bell et al. |

(56) References Cited

U.S. PATENT DOCUMENTS

| | | | |
|---|---|---|---|
| 2009/0185175 A1 | 7/2009 | Cole et al. | |
| 2009/0202191 A1 | 8/2009 | Ramachandran | |
| 2009/0219959 A1 | 9/2009 | Murison et al. | |
| 2010/0269143 A1 | 10/2010 | Rabowsky | |
| 2010/0279604 A1 | 11/2010 | Wood | |
| 2010/0322058 A1 | 12/2010 | Hutt et al. | |
| 2012/0063752 A1 | 3/2012 | Cochran | |
| 2012/0188865 A1 | 7/2012 | Michaelis et al. | |
| 2013/0120831 A1 | 5/2013 | McClean et al. | |
| 2013/0175450 A1 | 7/2013 | Scherer et al. | |
| 2013/0216180 A1 | 8/2013 | Tan et al. | |
| 2013/0315590 A1 | 11/2013 | Zhou | |
| 2014/0334284 A1 | 11/2014 | Byun et al. | |
| 2015/0104141 A1 | 4/2015 | Logunov et al. | |
| 2015/0244458 A1 | 8/2015 | Erkmen et al. | |
| 2015/0288542 A1 | 10/2015 | Ashrafi et al. | |
| 2016/0043794 A1 | 2/2016 | Ashrafi et al. | |
| 2016/0204866 A1 | 7/2016 | Boronson et al. | |
| 2016/0204896 A1 | 7/2016 | Yu et al. | |
| 2017/0034250 A1 | 2/2017 | Sobhani et al. | |
| 2017/0139079 A1 | 5/2017 | Alfano et al. | |
| 2017/0280211 A1* | 9/2017 | Damaghi | H04J 14/04 |
| 2017/0302048 A1 | 10/2017 | Li et al. | |
| 2018/0131447 A1 | 5/2018 | Soares et al. | |
| 2019/0074893 A1 | 3/2019 | Kaen et al. | |
| 2019/0334609 A1 | 10/2019 | Alavi et al. | |
| 2020/0050959 A1 | 2/2020 | Ashrafi | |
| 2020/0277087 A1 | 9/2020 | Kaen | |
| 2021/0050920 A1* | 2/2021 | Jia | H04L 12/2885 |

FOREIGN PATENT DOCUMENTS

| | | | | |
|---|---|---|---|---|
| EP | 174540 | A2 | 3/1986 | |
| EP | 883322 | B1 | 7/2000 | |
| EP | 1462883 | A2 | 9/2004 | |
| EP | 1742408 | A2 * | 1/2007 | H04L 9/0852 |
| JP | H5-72591 | A1 | 3/1993 | |
| RU | 2155447 | C1 | 8/2000 | |
| RU | 2459284 | C2 | 8/2012 | |
| WO | 9508778 | A1 | 3/1995 | |
| WO | 9844512 | A1 | 10/1998 | |
| WO | 2006101873 | A2 | 9/2006 | |
| WO | 2014107696 | A1 | 7/2014 | |
| WO | 2017165429 | A1 | 9/2017 | |
| WO | 2020144319 | A1 | 7/2020 | |

OTHER PUBLICATIONS

A. Hasegawa, H. Toda, M. Shikata, Y. Ozeki, T. Suzaki, Y. Ueno, K. Tajima, Experimental demonstration of the compressed optical packet multiplexing scheme, Journal of Optical Networking, vol. 1, No. 7 (Jul. 2002), pp. 221-236, 42304250.
Anjali Agarwal, et al., All-Optical Loadable And Erasable Storage Buffer Based On Parametric Nonlinearity In Fiber, Journal of Lightwave Technology, Jul. 2005, pp. 2229-2238, vol. 23, Issue No. 7, United States.
Bernd Friedrichs et al., Error-Control Coding and Packet Processing for Broadband Relay Satellite Networks with Optical and Microwave Links, 2012 6th Advanced Satellite Multimedia Systems Conference (ASMS) and 12th Signal Processing for Space Communications Workshop (SPSC) (2012), pp. 101-110.
Bo E. Miller and Yuzuru Takashima, Cavity Techniques For Holographic Data Storage Recording, Optics Express, Mar. 14, 2016, vol. 24, Issue 6, pp. 6300-6317, Optical Society of America, United States.
E. V. Carrera, R. Bianchini, Disk caching with an optical ring, Appl. Opt. Dec. 10, 2000:39 (35):666380 (Camrera 2000).
European Search Report and Written Opinion, dated Nov. 5, 2019 issued in corresponding European Application 17 770 999.5 (Search Report 4 pgs.; Opinion 3 pgs.; totaling 7 pgs.).
F. Della Valle, et al., Extremely Long Decay Time Optical Cavity, Optics Express, May 6, 2014, pp. 11570-11577, vol. 22, Issue 10, Optical Society of America, United States.
Federal Institute of Industrial Property, Search Report dated Apr. 1, 2019.
Federal Institute of Industrial Property, Search Report dated Jun. 4, 2019 (issued Jul. 29, 2019).
Francois Leo et al., Temporal cavity solitons in one-dimensional Kerr media as bits in all-optical buffer, Nature Photonics, 4:471-476, May 23, 2010.
G. S. McDonald et al., Spatial solitary-wave optical memory, Journal of the Optical Society of America B (Opted Physics) (J. Opt. Soc. Am.), 7(7):1328-1335, Jul. 1990.
G.D. Bartolini, D.K. Serkland, P. Kumar, W.L. Kath. (1997). All-optical storage of a picosecondpulse packet using parametric amplification. IEEE Photomcs Technology Letters, 9(7), 1020-1022 [Bartolini 1997].
Geoffrey W. Burr et al., Angle and Space Multiplexed Holographic Storage Using The 90° Geometry, Optics Communications, May 15, 1995, pp. 49-55, vol. 117, Issues 1-2, United States.
Geoffrey W. Burr et al., Volume Holographic Data Storage At an Areal Density Of 250 GIGAPIXELS/IN./\2, Optics Letters, vol. 26, No. 7, Apr. 1, 2001, pp. 444-446, United States.
J .H. Reif, A. Tyagi. An Optical Delay Line Memory Model with Efficient Algorithms, Optical Engineering, 36(9), (1997).
J. Ashley et al., Holographic Data Storage, IBM Journal of Research and Development, vol. 44, Issue 3, May 2000, pp. 341-368, United States.
Keiji Kuroda and Yuzo Yoshikuni, Two-Wavelength Pump-Probe Technique Using Single Distributed Feedback Laser Array To Probe Gain Recovery of an Erbium-Doped Fiber Amplifier, Optical Fiber Technology, Mar. 2017, pp. 20-22, vol. 34, Elsevier, Inc.
Mansour I. Irshid and Moshen Kavehrad, Star Couplers With Gain Using Fiber Amplifiers, IEEE Photonics Technology Letters, Jan. 1992, pp. 58-60, vol. 4, No. 1, IEEE Xplore Digital Library, United States.
Obulapathi N. Challa et al., Distributed Data Storage on CubeSat Clusters, Advances in Computing, 3(3):36-49 (2013).
Paul F. McManamon et al., Laser Radar, Progress and Opportunities in Active Electro-Optical Sensing, National Research Council of the National Academies, 2014.
PCT International Search Report, dated Aug. 22, 2017 in International Application No. PCT/U52017/023431 (4 pages).
Robert W. Boyd et al., Applications of Slow Light in Telecommunications, Optics & Photonics News, 17(4):18-23, Apr. 2006.
S.L. Tsao, T.Y. Chen, Comparison of Two 1550 nm Ultra Narrow-Band Optical Infinite Impulse Response Filters for High-Speed Optical Signal Processing, Optical Storage and Optical Information Processing, Proceedings of SPIE, vol. 4081, 2000.
Shankar Pidishety et al., Investigation of scalability of all-fiber fused mode selective coupler for generating multiple OAM states, Proceedings of International Conference on Fiber Optics and Photonics, Jan. 2016.
Singapore Search Report and Written Opinion, dated Aug. 20, 2019 issued in Singapore Application No. 10201901665X.
Stephane Gagnon et al., Recent developments in satellite laser communications: Canadian context. Proc. International Conference on Space Optical Systems and Applications (ICSOS) (2012).
The International Bureau of WIPO, International Preliminary Report on Patentability for Intl. Appl. No. PCT/U52017/023431, dated Sep. 25, 2018, 7 pages, Geneva, Switzerland.
V.W.S. Chan, K. L. Hall, E. Modiano, K. A. Rauschenback. Architectures and Technologies for High-Speed Optical Data Networks, Journal of Lightwave Technology, vol. 16, Issue: 12, Dec. 1998.
Paul Marks, It's A Cloud, but Not As We Know It, ACM News, Communications of the ACM, Jul. 8, 2019, United States.
KIPO Notice of Preliminary Rejection (English Translation), dated Nov. 25, 2019, in S. Korean Patent Application No. 10-2018-7030269 (3 pages).
PCT International Search Report and Written Opinion in International Application No. PCT/US2019/044744 dated Oct. 29, 2019 (11 pages).
PCT International Search Report and Written Opinion in International Application No. PCT/US2019/045825 dated Nov. 1, 2019 (7 pages).

(56) References Cited

OTHER PUBLICATIONS

PCT International Search Report and Written Opinion in International Application No. PCT/US2019/059523 dated Jan. 22, 2020 (12 pages).
JPO Notice of Preliminary Rejection (English Translation), dated Jan. 14, 2020, in Japanese Patent Application No. 2018-550424 (4 pages).
JPO Notice of Preliminary Rejection (English Translation), dated Jan. 14, 2020, in Japanese Patent Application No. 2019-056078 (4 pages).
KIPO Notice of Preliminary Rejection (with English Translation), dated Jul. 21, 2020, in S. Korean Patent Application No. 10-2019-7005794 (10 pages).
U.S. Patent and Trademark Office, U.S. Appl. No. 16/262,225, Office Action dated Jul. 21, 2020.
U.S. Patent and Trademark Office, U.S. Appl. No. 16/536,358, Notice of Allowance dated May 26, 2020.
Extended European Search Report and Search Opinion for EP Application No. 20 184 820.7, dated Oct. 29, 2020, (Search Report 4 pgs.; Opinion 1 pg.; totaling 5 pgs.).
Extended European Search Report and Search Opinion for EP Application No. 20 184 821.5, dated Nov. 4, 2020 (Search Report 5 pgs.; Opinion 6 pgs.; totaling 11 pgs.).
IP Australia, Australian Patent Application No. 2020201142, Examination Report No. 1 for Standard Patent Application, dated Oct. 31, 2020, 5 pp.
Russian Federation Patent Office, Russian Patent Application No. 2021104935, Official Action, dated Jun. 11, 2021 (Official Action, 6 pp.: English translation, 5 pp.; totaling 11 pp.).
Russian Federation Patent Office, Russian Patent Application No. 2021104935, Search Report, dated Jun. 11, 2021 (Search Report, 2 pp.; English translation, 2 pp.; totaling 4 pp.).
Israel Patent Office, Israeli Patent Application No. 27826, Office Action, dated Oct. 29, 2020, (Office Action, 4 pp.; English translation, 6 pp.; totaling 10 pp.).
U.S. Patent and Trademark Office, U.S. Appl. No. 16/529,479, Office Action dated Jun. 17, 2021, 12 pp.

\* cited by examiner

SYSTEMS AND METHODS FOR BUILDING, OPERATING AND CONTROLLING MULTIPLE AMPLIFIERS, REGENERATORS AND TRANSCEIVERS USING SHARED COMMON COMPONENTS

CROSS-REFERENCE TO RELATED APPLICATIONS

The present non-provisional patent application claims the benefit of and priority to U.S. Provisional Patent Application No. 62/755,631, filed Nov. 5, 2018, the entire contents of which are incorporated herein by reference.

FIELD OF INVENTION

The present invention relates to systems and methods for building, operating and controlling multiple amplifiers, regenerators and/or transceivers using shared common components. The present invention also relates to using such systems and methods in conjunction with a recirculating loop for storing data in motion or other devices and systems.

BACKGROUND OF THE INVENTION

The expansion of data centers, broadband communications and computationally intensive signal processing is driving the demand for high capacity data storage that potentially consumes less power and has higher security. Modern data centers also often require rapid access to the same data stored on a common drive to perform, for example, high performance computing (HPC). In addition, there is an increasing interest among many actors within the information technology (IT) storage industry (e.g., end customers, data centers, in system programmers (ISP), in circuit programmers (ICP)) in being able to erase sensitive data (e.g., government data, military data) definitively and completely in an immediate manner.

Currently, solid state drives (SSDs), such as non-volatile NAND flash memory based drives, and hard disk drives (HDDs) are examples of storage devices used to store data in data centers. Conventional data centers based on those solid-state based storage devices have a variety of drawbacks. For example, data storage using those conventional storage devices consumes a large amount of power and requires expensive maintenance. In addition, data storage involving many of those conventional storage devices generates a large amount of heat, necessitating cooling systems, which in turn require additional cost and energy consumption. Moreover, the throughput at which data can be read from or written to those conventional storage devices is limited by the speed of electronics to, for example, a few Gbit/s. Additionally, when data is erased from a conventional non-volatile solid-state memory, an imprint of the erased data typically remains and one could recover the erased data with proper skills and technology. Furthermore, to scale storage in the data center using those conventional storage devices, it is necessary to either buy more of the storage devices or replace the current storage devices with better performing ones. Accordingly, constructing and upgrading data centers using the conventional storage devices is a costly and time-consuming process.

There is, therefore, a need for a data storage apparatus and method that overcomes one or more of the above and other deficiencies of data storage using conventional storage devices. In addition, there is a need for a more cost-effective and efficient design for building, operating and controlling multiple amplifiers, regenerators and/or transceivers that may be used in conjunction with data storage devices or systems, or in conjunction with other devices or systems.

SUMMARY OF THE INVENTION

It has now been found that the above and related objects of the present invention are obtained in the form of several related aspects, including systems and methods for building, operating and controlling multiple amplifiers, regenerators and/or transceivers using shared common components.

More particularly, the present invention relates to a system comprising a recirculating loop configured to store an electromagnetic wave (e.g., optical wave) signal, the recirculating loop comprising a transmission medium (e.g., free space, outer space, vacuum, underwater, crystals, nonlinear media, waveguides, optical fibers, to name a few) and a plurality of transceivers configured to introduce the electromagnetic wave signal into the transmission medium and retrieve the electromagnetic wave signal from the transmission medium, and a signal conditioning system comprising a plurality of signal conditioners coupled to the transmission medium, the plurality of signal conditioners configured to amplify or regenerate the electromagnetic wave signal traveling in the transmission medium, one or more pump laser sources, wherein at least one of the one or more pump laser sources is configured to provide a pump laser beam to at least two of the plurality of signal conditioners, and one or more control circuits for controlling the plurality of signal conditioners, wherein at least one of the one or more control circuits is configured to control at least two of the plurality of signal conditioners.

In at least one embodiment, the transmission medium comprises a waveguide.

In at least one embodiment, the waveguide comprises an optical fiber.

In at least one embodiment, the transmission medium comprises free space.

In at least one embodiment, the plurality of signal conditioners comprises amplifiers, regenerators, or a combination of amplifiers and regenerators.

In at least one embodiment, the amplifiers comprise at least one phase sensitive amplifier.

In at least one embodiment, the regenerators comprise at least one phase sensitive parametric amplifier.

In at least one embodiment, each of the amplifiers comprises a fiber amplifier doped with a gain medium.

In at least one embodiment, the gain medium comprises a fluorescent element.

In at least one embodiment, the gain medium comprises a rare-earth element.

In at least one embodiment, the gain medium comprises erbium.

In at least one embodiment, the system further comprises a coupler configured to combine the pump laser beam with the electromagnetic wave signal and send the combined beam/signal to a corresponding one of the plurality of signal conditioners.

In at least one embodiment, the at least one of the one or more control circuits comprises a photodetector configured to measure input and output optical powers of each of the at least two of the plurality of signal conditioners and a processor configured to compare the measured input and output optical powers and adjust an input pump laser power for the each of the at least two of the plurality of signal conditioners.

In at least one embodiment, the system further comprises a variable attenuator coupled to the at least one of the one or more pump laser sources and to the at least one of the one or more control circuits, wherein the variable attenuator is configured to control the pump laser beam to be sent to a corresponding one of the plurality of signal conditioners based on the adjusted input pump laser power determined by the processor in the at least one of the one or more control circuits.

In at least one embodiment, the regenerators are configured to re-amplify, re-shape, or re-time the electromagnetic wave signal traveling in the transmission medium.

In at least one embodiment, the system further comprises one or more clock sources, wherein at least one of the one or more clock sources is configured to provide a clock signal to at least two of the regenerators for re-timing the electromagnetic wave signal.

In at least one embodiment, the regenerators comprise crystals or optical fibers.

In at least one embodiment, the crystals or the optical fibers are doped with a fluorescent element.

In at least one embodiment, the crystals or the optical fibers are doped with a rare-earth element.

In at least one embodiment, the crystals or the optical fibers are doped with erbium.

In at least one embodiment, the regenerators comprise all-optical regenerators.

In at least one embodiment, the regenerators comprise at least one amplifier and at least one absorber.

In at least one embodiment, the regenerators comprise at least one amplifier configured to operate in a saturation regime.

In at least one embodiment, the regenerators comprise at least one nonlinear filter.

In at least one embodiment, the system further comprises one or more laser sources, wherein at least one of the one or more laser sources is configured to provide a laser beam to at least two of the plurality of transceivers.

In at least one embodiment, the system further comprises one or more laser sources, wherein each of the plurality of transceivers comprises one or more transmitters and one or more receivers, and at least one of the one or more laser sources is configured to provide a laser beam to at least one of the one or more transmitters in one of the plurality of transceivers and to at least one of the one or more receivers in the other one of the plurality of transceivers.

In at least one embodiment, the system further comprises one or more laser sources, wherein each of the plurality of transceivers comprises one or more transmitters and one or more receivers, and at least one of the one or more laser sources is configured to provide a laser beam to at least one of the one or more transmitters in one of the plurality of transceivers and to at least one of the one or more receivers in the same one of the plurality of transceivers.

In at least one embodiment, the system further comprises a single clock source configured to provide a clock signal to at least two of the plurality of transceivers.

In at least one embodiment, the at least one of the one or more laser sources provides the laser beam to a modulator in the at least one of the one or more transmitters in the one of the plurality of transceivers and to a mixer in the at least one of the one or more receivers in the other one of the plurality of transceivers.

In at least one embodiment, the at least one of the one or more laser sources provides the laser beam to a modulator in the at least one of the one or more transmitters in the one of the plurality of transceivers and to a mixer in the at least one of the one or more receivers in the same one of the plurality of transceivers.

In at least one embodiment, the single clock source provides the clock signal to an integrated circuit (IC) in each of the at least two of the plurality of transceivers.

In at least one embodiment, the plurality of transceivers is substantially co-located.

In at least one embodiment, the plurality of signal conditioners is substantially co-located.

In at least one embodiment, the system further comprises one or more multiplexers, wherein at least one of the one or more multiplexers is communicably coupled to at least two of the plurality of signal conditioners.

In at least one embodiment, the at least two of the plurality of signal conditioners comprise at least two regenerators.

In at least one embodiment, the at least two regenerators comprise at least two phase sensitive parametric amplifiers.

In at least one embodiment, the system further comprises one or more demultiplexers, wherein at least one of the one or more demultiplexers is communicably coupled to at least two of the plurality of signal conditioners.

In at least one embodiment, the at least two of the plurality of signal conditioners comprise at least two regenerators.

In at least one embodiment, the at least two regenerators comprise at least two phase sensitive parametric amplifiers.

The present invention further relates to a system comprising a transmission medium, a plurality of transceivers configured to introduce the electromagnetic wave signal into the transmission medium and retrieve the electromagnetic wave signal from the transmission medium, and one or more laser sources, wherein at least one of the one or more laser sources is configured to provide a laser beam to at least two of the plurality of transceivers.

In at least one embodiment, each of the plurality of transceivers comprises one or more transmitters and one or more receivers, and the at least one of the one or more laser sources provides the laser beam to at least one of the one or more transmitters in one of the at least two of the plurality of transceivers and to at least one of the one or more receivers in the other one of the at least two of the plurality of transceivers.

In at least one embodiment, each of the plurality of transceivers comprises one or more transmitters and one or more receivers, and at least one of the one or more laser sources is configured to provide a laser beam to at least one of the one or more transmitters in one of the plurality of transceivers and to at least one of the one or more receivers in the same one of the plurality of transceivers.

In at least one embodiment, the system further comprises a single clock source configured to provide a clock signal to at least two of the plurality of transceivers.

In at least one embodiment, the at least one of the one or more laser sources provides the laser beam to a modulator in the at least one of the one or more transmitters in the one of the at least two of the plurality of transceivers and to a mixer in the at least one of the one or more receivers in the other one of the at least two of the plurality of transceivers.

In at least one embodiment, the at least one of the one or more laser sources provides the laser beam to a modulator in the at least one of the one or more transmitters in the one of the plurality of transceivers and to a mixer in the at least one of the one or more receivers in the same one of the plurality of transceivers.

In at least one embodiment, the single clock source provides the clock signal to an IC in each of the at least two of the plurality of transceivers.

In at least one embodiment, the transmission medium comprises a waveguide.

In at least one embodiment, the waveguide comprises an optical fiber.

In at least one embodiment, the transmission medium comprises free space.

In at least one embodiment, the transmission medium is configured to store an electromagnetic wave signal.

In at least one embodiment, the plurality of transceivers is substantially co-located.

In addition, the present invention also relates to a method for storing an electromagnetic wave signal in a transmission medium, the method comprising amplifying or regenerating, using a plurality of signal conditioners coupled to the transmission medium, an electromagnetic signal traveling in the transmission medium, providing, from one or more pump laser sources, pump laser beams to the plurality of signal conditioners, wherein at least one of the one or more pump laser sources provides a pump laser beam to at least two of the plurality of signal conditioners, and controlling, using one or more control circuits, the plurality of signal conditioners, wherein at least one of the one or more control circuits controls at least two of the plurality of signal conditioners.

In at least one embodiment, the transmission medium comprises a waveguide.

In at least one embodiment, the waveguide comprises an optical fiber.

In at least one embodiment, the transmission medium comprises free space.

In at least one embodiment, the plurality of signal conditioners comprises amplifiers, regenerators, or a combination of amplifiers and regenerators.

In at least one embodiment, the amplifiers comprise at least one phase sensitive amplifier.

In at least one embodiment, the regenerators comprise at least one phase sensitive parametric amplifier.

In at least one embodiment, each of the amplifiers comprises a fiber amplifier doped with a gain medium.

In at least one embodiment, the gain medium comprises a fluorescent element.

In at least one embodiment, the gain medium comprises a rare-earth element.

In at least one embodiment, the gain medium comprises erbium.

In at least one embodiment, the method further comprises combining, using a coupler, the pump laser beam with the electromagnetic wave signal and sending, using the coupler, the combined beam/signal to a corresponding one of the plurality of signal conditioners.

In at least one embodiment, the at least one of the one or more control circuits comprises a photodetector and a processor, and the controlling step comprises measuring, using the photodetector, input and output optical powers of each of the at least two of the plurality of signal conditioners, and comparing, using the processor, the measured input and output optical powers to adjust an input pump laser power for the each of the at least two of the plurality of signal conditioners.

In at least one embodiment, the method further comprises controlling, using a variable attenuator coupled to the at least one of the one or more pump laser sources and to the at least one of the one or more control circuits, the pump laser beam to be sent to a corresponding one of the plurality of signal conditioners based on the adjusted input pump laser power determined by the comparing step.

In at least one embodiment, the regenerating step comprises re-amplifying, re-shaping, or re-timing, using the regenerators, the electromagnetic wave signal traveling in the transmission medium.

In at least one embodiment, the re-timing step comprises providing, using one or more clock sources, clock signals to the regenerators, wherein at least one of the one or more clock sources provides a clock signal to at least two of the regenerators.

In at least one embodiment, the regenerating step is performed all optically in an optical domain.

In at least one embodiment, the plurality of signal conditioners is substantially co-located.

In at least one embodiment, the amplifying or regenerating step comprises using one or more multiplexers, wherein at least one of the one or more multiplexers is communicably coupled to at least two of the plurality of signal conditioners.

In at least one embodiment, the at least two of the plurality of signal conditioners comprise at least two regenerators.

In at least one embodiment, the at least two regenerators comprise at least two phase sensitive parametric amplifiers.

In at least one embodiment, the amplifying or regenerating step comprises using one or more demultiplexers, wherein at least one of the one or more demultiplexers is communicably coupled to at least two of the plurality of signal conditioners.

In at least one embodiment, the at least two of the plurality of signal conditioners comprise at least two regenerators.

In at least one embodiment, the at least two regenerators comprise at least two phase sensitive parametric amplifiers.

Furthermore, the present invention also relates to a method of using a plurality of transceivers connected to a transmission medium, the method comprising inputting, using the plurality of transceivers, an electromagnetic wave signal into the transmission medium, outputting, using the plurality of transceivers, the electromagnetic wave signal from the transmission medium, and providing, from a single laser source, a laser beam to at least two of the plurality of transceivers.

In at least one embodiment, each of the plurality of transceivers comprises one or more transmitters and one or more receivers, and the single laser source provides the laser beam to at least one of the one or more transmitters in one of the at least two of the plurality of transceivers and to at least one of the one or more receivers in the other one of the at least two of the plurality of transceivers.

In at least one embodiment, each of the plurality of transceivers comprises one or more transmitters and one or more receivers, the method further comprising the step of providing, from the single laser source, a laser beam to at least one of the one or more transmitters in one of the plurality of transceivers and to at least one of the one or more receivers in the same one of the plurality of transceivers.

In at least one embodiment, the method further comprises providing, from a single clock source, a clock signal to at least two of the one or more transceivers.

In at least one embodiment, the single laser source provides the laser beam to a modulator in the at least one of the one or more transmitters in the one of the at least two of the plurality of transceivers and to a mixer in the at least one of the one or more receivers in the other one of the at least two of the plurality of transceivers.

In at least one embodiment, the single laser source provides the laser beam to a modulator in the at least one of the one or more transmitters in the one of the plurality of transceivers and to a mixer in the at least one of the one or more receivers in the same one of the plurality of transceivers.

In at least one embodiment, the single clock source provides the clock signal to an IC in each of the at least two of the plurality of transceivers.

In at least one embodiment, the transmission medium comprises a waveguide.

In at least one embodiment, the waveguide comprises an optical fiber.

In at least one embodiment, the transmission medium comprises free space.

In at least one embodiment, the transmission medium is configured to store an electromagnetic wave signal.

In at least one embodiment, the plurality of transceivers is substantially co-located.

Although specific features, capabilities and advantages have been enumerated above, various embodiments may include some, none, or all of the enumerated features, capabilities and advantages. These and other technical features, capabilities and advantages of the disclosed subject matter, along with the invention itself, will be more fully understood after a review of the following figures, detailed descriptions and claims.

BRIEF DESCRIPTION OF THE DRAWINGS

Exemplary embodiments of the present invention will be described with references to the accompanying figures, wherein.

DETAILED DESCRIPTION OF PREFERRED EMBODIMENTS

Information or any kind of data can be stored as electromagnetic waves (e.g., coherent (i.e., laser) or non-coherent optical beams, radio frequency (RF) signals, and other types of electromagnetic wave signals, to name a few), which can be transmitted and/or reflected between structures or within structures in various transmission media (e.g., free space, outer space, vacuum, underwater, crystals, nonlinear media, waveguides, optical fibers, to name a few). For example, a recirculating loop may be used to store "data in motion" by keeping electromagnetic wave signals, which may carry data, in a continuous motion, transmitted and/or reflected between or within structures and regenerated (e.g., by signal amplification) as needed. The recirculating loop may comprise a transmission medium (e.g., free space, waveguide, optical fiber, cavity under a vacuum condition, to name a few) through which an electromagnetic wave signal can travel, and one or more transceivers configured to introduce the electromagnetic wave signal into the transmission medium and retrieve the electromagnetic wave signal from the transmission medium. For example, the recirculating loop may be formed by satellites and/or other vessels that reflect or otherwise retransmit the data in free space. In another example, the recirculating loop may comprise a waveguide, such as an optical fiber. Various systems and methods of storing data in motion in a recirculating loop are described in U.S. patent application Ser. No. 15/465,356, which has been published as US 2017/0280211 A1 and is incorporated by reference herein in its entirety.

In one example, a satellite-based laser, a land or on/underwater based laser or optical beam, or any other electromagnetic radiation may be used to transmit and store data. The terms "electromagnetic wave signal" and "electromagnetic wave beam" are used herein interchangeably. Electromagnetic radiation or electromagnetic beam as used herein may include any kind of electromagnetic signal, including a laser beam or signal, a maser beam or signal, an optical beam or signal, or any type of wired or wireless signal, including acoustic waves, radio waves, IR radiation, UV radiation, microwave-band transmission, or any combination of more than one of the foregoing. While referred to herein sometimes simply as a laser beam or signal, other types of optical signals and other types of electromagnetic radiation transmissions, including radio waves, microwaves, IR, UV and combinations of bandwidths of wavelengths of electromagnetic radiation, whether guided, shaped, phased, or none of the foregoing, are also intended to be included.

In embodiments, systems for storing electromagnetic wave signals in a recirculating loop may be configured to extinguish or "turn off" the electromagnetic wave signals stored therein. When the electromagnetic wave signals are extinguished, data stored therein is definitively and instantly lost and cannot be recovered, unlike the data erased from a solid-state memory.

Disclosed are systems and methods for building, operating and/or controlling multiple signal conditioners (e.g., amplifiers, regenerators, a combination of amplifiers and regenerators, to name a few) and/or transceivers using shared common components to achieve a more efficient and/or cost-effective design. Such systems and methods may be used in conjunction with a recirculating loop for storing data in motion, or with other devices or systems of the similar architecture.

For example, multiple signal conditioners, such as amplifiers, regenerators, or a combination of amplifiers and regenerators, may be placed along the path of an electromagnetic wave signal to restore the passing electromagnetic wave signal to its original or previous state and/or to compensate for any degradation.

An amplifier may be any device configured to amplify an electromagnetic wave signal. In embodiments, an amplifier may comprise crystals or optical fibers. In embodiments, the crystals and optical fibers may be doped with a gain medium comprising, for example, a fluorescent element or a rare-earth element, such as erbium. In embodiments, the optical fiber used in the amplifier may include additional devices at the input to inject the electromagnetic wave signal into the optical fiber, and other devices at the output to restore the electromagnetic wave beam to its original shape and size.

Each amplifier may require many, various components. For example, an amplifier may be used in conjunction with a pump laser source, which is configured to provide a pump laser beam to the amplifier. In another example, an amplifier may be used in conjunction with a control circuit, which is configured to control the operation of the amplifier.

Amplifiers, such as erbium-doped fiber amplifiers (EDFAs), are typically used to periodically amplify electromagnetic wave signals in an optical fiber communication link that extends over a long distance. Such periodic gains provided by the amplifiers along the fiber communication link offset the signal power loss due to the transmission optical fiber. In a conventional system, amplifiers are placed apart from each other (e.g., placed at intervals of 50 to 100 kilometers) such that each amplifier is likely isolated from the other amplifiers and cannot readily "share" components with the other amplifiers. Each amplifier comprises many components. For example, each EDFA used in such a conventional system may comprise erbium doped fiber, pump laser source, optical isolator, optical coupler and control circuit.

By contrast, a system, such as a system for storing data in motion using a recirculating loop, can be configured such that multiple amplifiers can be placed at the same location, or substantially co-located, i.e., located in the vicinity of each other (e.g., near or substantially adjacent to each other, physically located in the same room or space, etc.). In such a system, it is possible for multiple amplifiers such as EDFAs to share one or more common components in order to achieve a more efficient and cost-effective design.

In addition, systems and methods for building, operating and/or controlling multiple signal conditioners (e.g., amplifiers, regenerators, a combination of amplifiers and regenerators, to name a few) and/or transceivers using shared common components may also be used in conjunction with other types of architectures wherein transmission equipment are placed at the same location, or substantially co-located, i.e., located in the vicinity of each other (e.g., near or substantially adjacent to each other, physically located in the same room or space, etc.). Examples of these types of architectures may include, but are not limited to, data centers where information may be sent and received within the same facility, and sensing equipment, such as RADAR and LIDAR, which send and receive data to and from the same location.

Figure 1:
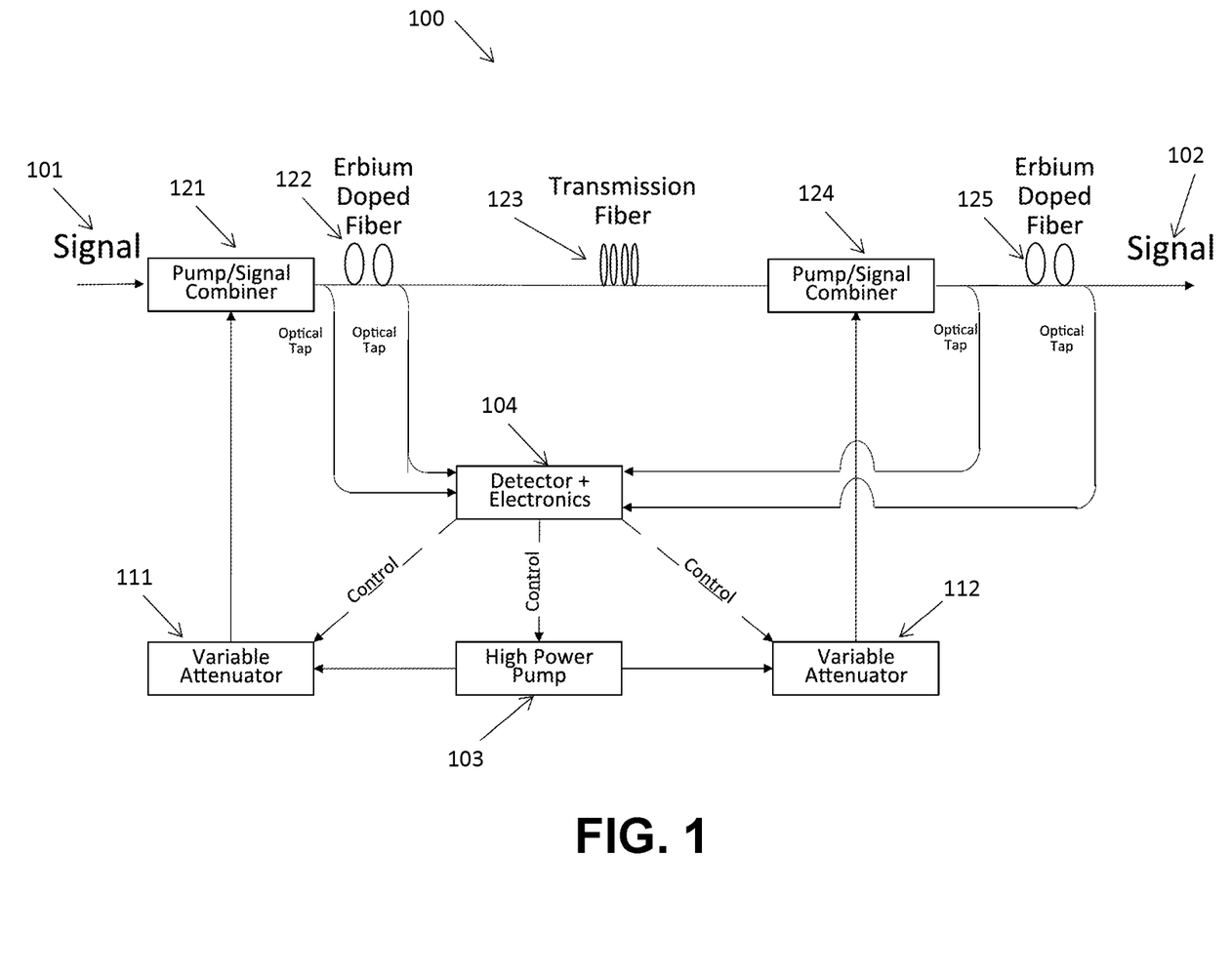
FIG. 1 is a schematic diagram of multiple amplifiers sharing components in accordance with an exemplary embodiment of the present invention.

FIG. 1 is a schematic diagram of a system 100 comprising at least two substantially co-located EDFAs sharing common components, such as a pump laser source 103 and/or a control circuit 104, in accordance with an exemplary embodiment of the present invention. In embodiments, the substantially co-located EDFAs may be coupled to each other by a transmission medium, such as a transmission fiber 123. FIG. 1 shows an electromagnetic wave signal 101 entering a first EDFA 121, 122. The amplified signal then passes through a transmission fiber 123. The signal then enters a second EDFA 124, 125 and exits the second EDFA as an amplified signal 102.

A single pump laser source 103 having sufficient output power may be used to provide a pump laser beam to two or more multiple EDFAs. As shown in FIG. 1, the output power of the pump laser source 103 may be split and sent to variable attenuators 111, 112, each of which may be coupled to the corresponding one of the multiple EDFAs. The variable attenuator 111, 112 may be configured to control the specific pump laser power needed for the corresponding EDFA. The pump laser beam may then be sent from the variable attenuators 111, 112 to erbium-doped fibers 122, 125 through the corresponding couplers 121, 124. Each of the couplers 121, 124 may be configured to combine the pump laser beam from the pump laser source 103 (via variable attenuators 111, 112) with the electromagnetic wave signal and send the combined pump laser beam and electromagnetic wave signal to the corresponding erbium-doped fiber 122, 125 to achieve amplification of the electromagnetic wave signal.

As shown in FIG. 1, at least two of the multiple EDFAs may be used in conjunction with a shared control circuit 104, which may be configured to control the operation of the EDFAs, such as the gain of the amplifiers. For example, the input power to and output power from the erbium-doped fiber 122, 125 may be measured by using, for example, a photodetector in the control circuit 104. The measured input and output powers may then be compared by using, for example, a processor comprising electronic circuitry in the control circuit 104 to determine the amplifier characteristics, such as gain. As a result of the comparison, the pump laser power input to the coupler 121, 124 can be adjusted accordingly. In embodiments, this adjustment of the pump laser power input may be performed by the pump laser source 103 and/or variable attenuator 111, 112 based on control signals from the control circuit 104, as shown in FIG. 1.

In embodiments, the shared control circuit 104 may be much faster than the changes that might occur to the amplifier gain. As such, by using many couplers and taking optical/electronic measurements sequentially from different multiple erbium-doped fibers, many EDFAs can share a single control circuit.

In embodiments, the pump laser source 103 and the control circuit 104 may account for a large fraction of the cost of the multiple EDFAs in the system 100. As such, sharing of the pump laser source and/or the control circuit by multiple EDFAs can provide the benefit of efficiency and cost-effectiveness.

As another example, phase sensitive amplifiers (PSAs) may be configured such that substantially co-located multiple PSAs can share one or more common components, such as a pump laser source, control circuit, and/or clock signal.

In long distance communication systems, wave distortion and relative time delay deviation may be accumulated even when amplifiers for regenerating signal amplitudes are used. This problem may require periodic regeneration by one or more regenerators to regenerate the original/previous waveform and synchronization of signals. For example, regenerators may be used for communication systems involving a distance of greater than 100 kilometers. A full signal regeneration, which is typically called a "3R" process, involves signal retiming, reshaping, and reamplification (or amplification) of the electromagnetic wave signal. A regenerator may be configured to conduct full electromagnetic wave signal regeneration. Alternatively, a regenerator may be configured to restore only some aspects of the electromagnetic wave signal by re-timing and/or re-shaping and/or re-amplification of the electromagnetic wave signal in part. In embodiments, the regenerator may also be configured to implement error correction to restore lost information or correct errors introduced into the data in motion. In embodiments, the regenerator may be used in conjunction with Wavelength Division Multiplexing (WDM), which enables the regenerator to improve the signal quality on different wavelength channels.

Any apparatus configured to re-amplify, re-shape, and/or re-time the electromagnetic wave signal in full or in part may be used to build regenerators. Regenerators can be implemented in various ways. In embodiments, the regenerator may be an all-optical or optoelectronic regenerator, wherein the all-optical regenerator is configured to regenerate the electromagnetic wave signal all optically in the optical domain, while the optoelectronic regenerator is configured to convert the electromagnetic wave signal to a corresponding electrical signal in the electrical domain, regenerate the converted electrical signal electrically and convert the regenerated electrical signal to a corresponding electromagnetic wave signal in the optical domain. In embodiments, the regenerator may comprise at least one amplifier and at least one absorber. In embodiments, the regenerator may comprise at least one amplifier configured to operate in a saturation regime. In embodiments, the regenerator may comprise a nonlinear filter configured to provide gain stabilization and/or reduce noise in the electromagnetic wave signal. In embodiments, the regenerator may comprise crystals or optical fibers. In embodiments, the regenerator may comprise crystals or optical fibers doped by a fluorescent element or a rare-earth element, such as erbium. In embodiments, the optical fiber used in the regenerator may comprise additional devices at the input to inject the electromagnetic wave signal into the optical fiber, and other devices at the output to restore the electromagnetic wave beam to its original shape and size. In embodiments, the regenerator may comprise at least one phase sensitive parametric amplifier.

In a system (e.g., a system for storing data in motion using a recirculating loop) where multiple regenerators can be substantially co-located, it is possible for multiple regenerators to share one or more common components in order to achieve a more efficient and cost-effective design.

Figure 2:
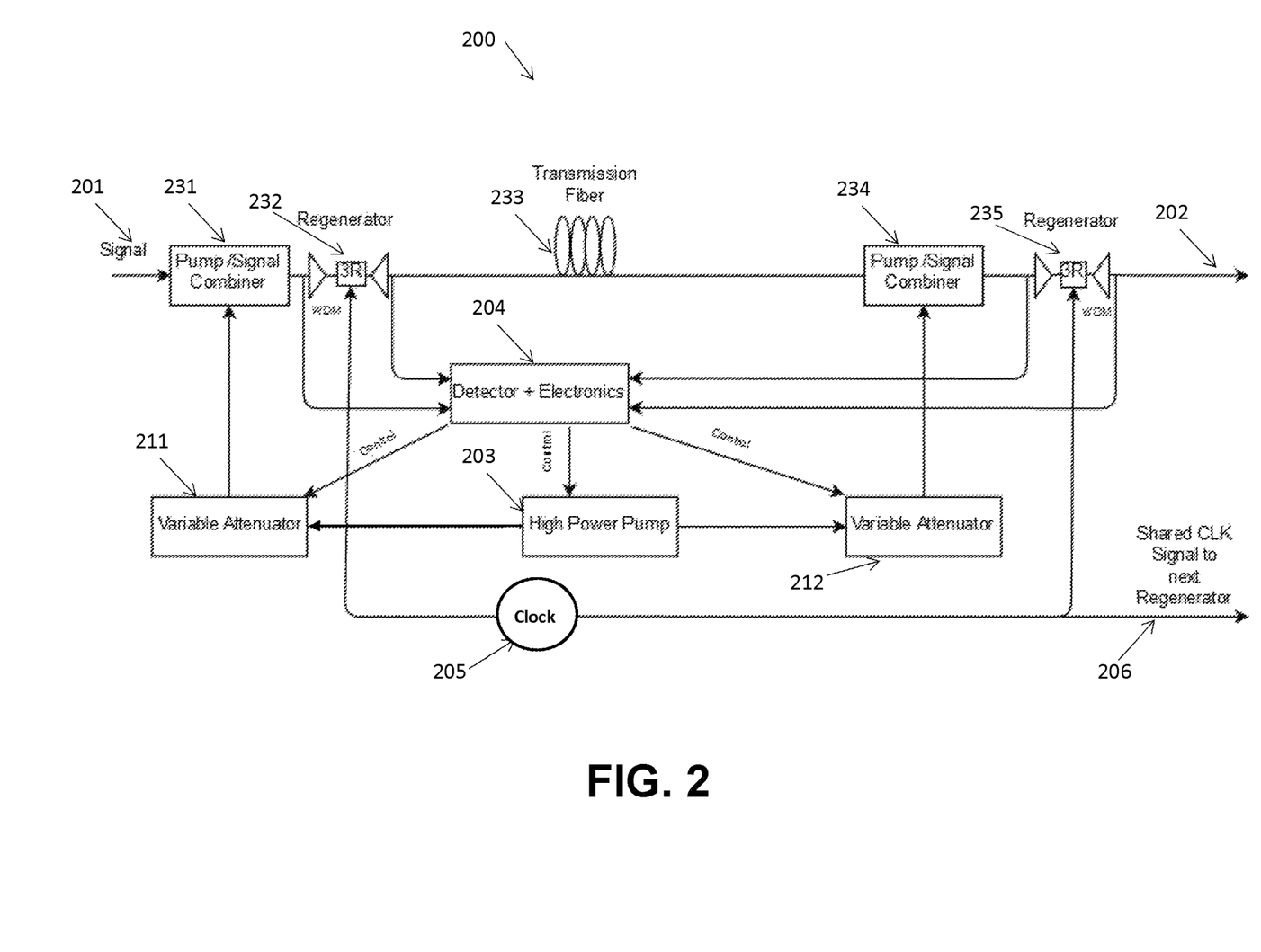
FIG. 2 is a schematic diagram of multiple regenerators sharing components n accordance with an exemplary embodiment of the present invention.

FIG. 2 is a schematic diagram of a system 200 comprising at least two substantially co-located regenerators 232, 235 sharing common components, such as a pump laser source 203, a control circuit 204, and/or a clock source 205, in accordance with an exemplary embodiment of the present invention. In embodiments, the substantially co-located regenerators 232, 235 may be coupled to each other by a transmission medium, such as a transmission fiber 233. FIG. 2 shows an electromagnetic wave signal 201 entering a first regenerator 232 through the corresponding coupler 231. The regenerated signal then passes through a transmission fiber 233. The signal then enters a second regenerator 235 through the corresponding coupler 234 and exits the second regenerator as a regenerated signal 202.

A single pump laser source 203 having sufficient output power may be used to provide a pump laser beam to two or more multiple regenerators 232, 235. As shown in FIG. 2, the output power of the pump laser source 203 may be split and sent to variable attenuators 211, 212, each of which may be coupled to the corresponding one of the multiple regenerators 232, 235. The variable attenuator 211, 212 may be configured to control the specific pump laser power needed for the corresponding regenerator. The pump laser beam may then be sent from the variable attenuators 211, 212 to the regenerators 232, 235 through the corresponding couplers 231, 234. Each of the couplers 231, 234 may be configured to combine the pump laser beam from the pump laser source 203 (via variable attenuators 211, 212) with the electromagnetic wave signal and to send the combined pump laser beam and electromagnetic wave signal to the corresponding regenerator 232, 235 to achieve full or partial regeneration of the electromagnetic wave signal.

As shown in FIG. 2, at least two of the multiple regenerators 232, 235 may be used in conjunction with a shared control circuit 204, which may be configured to control the operation of the regenerators, such as the gain of the regenerators. For example, the input power to and output power from the regenerator 232, 235 may be measured by using, for example, a photodetector in the control circuit 204. The measured input and output powers may then be compared by using, for example, a processor comprising electronic circuitry in the control circuit 204 to determine the regenerator characteristics, such as gain. As a result of the comparison, the pump laser power input to the coupler 231, 234 can be adjusted accordingly. In embodiments, this adjustment of the pump laser power input may be performed by the pump laser source 203 and/or variable attenuator 211, 212 based on control signals from the control circuit 204, as shown in FIG. 2.

In embodiments, the shared control circuit 204 may be much faster than the changes that might occur to the regenerator gain. As such, by using many couplers and taking optical/electronic measurements sequentially from different multiple regenerators, many regenerators can share a single control circuit.

As shown in FIG. 2, at least two of the substantially co-located multiple regenerators 232, 235 may use a shared clock source 205, which may be configured to provide a clock signal to each of at least two of the multiple regenerators 232, 235 for re-timing the electromagnetic wave signal.

In embodiments, the system 200 may further comprise one or more multiplexers (not shown in FIG. 2), wherein at least one of the one or more multiplexers is communicably coupled to and shared by the two substantially co-located regenerators 232, 235. Additionally or alternatively, the system 200 may further comprise one or more demultiplexers (not shown in FIG. 2), wherein at least one of the one or more demultiplexers is communicably coupled to and shared by the two substantially co-located regenerators 232, 235. In embodiments, the two regenerators 232, 235 sharing at least one of the one or more multiplexers and/or at least one of the one or more demultiplexers comprise phase sensitive parametric amplifiers.

In embodiments, the pump laser source 203, the control circuit 204, the clock source 205 and/or multiplexers/demultiplexers may account for a large fraction of the cost of the multiple regenerators in the system 200. As such, sharing of one or more common components, such as pump laser source, control circuit, clock source and/or multiplexers/demultiplexers, by multiple regenerators can provide the benefit of efficiency, cost-effectiveness and overall reduction in power consumption of the regenerators.

Transceivers may be used to transmit and receive electromagnetic wave signals through a transmission medium, such as free space, waveguide, optical fiber, to name a few. In embodiments, a transceiver may comprise one or more transmitters and one or more receivers. In embodiments, a transceiver may comprise many components, such as input/output interfaces, modulators, mixers, amplifiers, active optic cables, and/or integrated circuits (e.g., application specific integrated circuit (ASIC)) comprising, for example, a digital signal processor (DSP), an optical transport network (OTN) framer/deframer, an analog-to-digital converter (ADC), and/or a digital-to-analog converter. (DAC).

In a system (e.g., a system for storing data in motion using a recirculating loop) where multiple transceivers can be substantially co-located, it is possible for multiple transceivers to share one or more common components in order to achieve a more efficient and cost-effective design.

Figure 3:
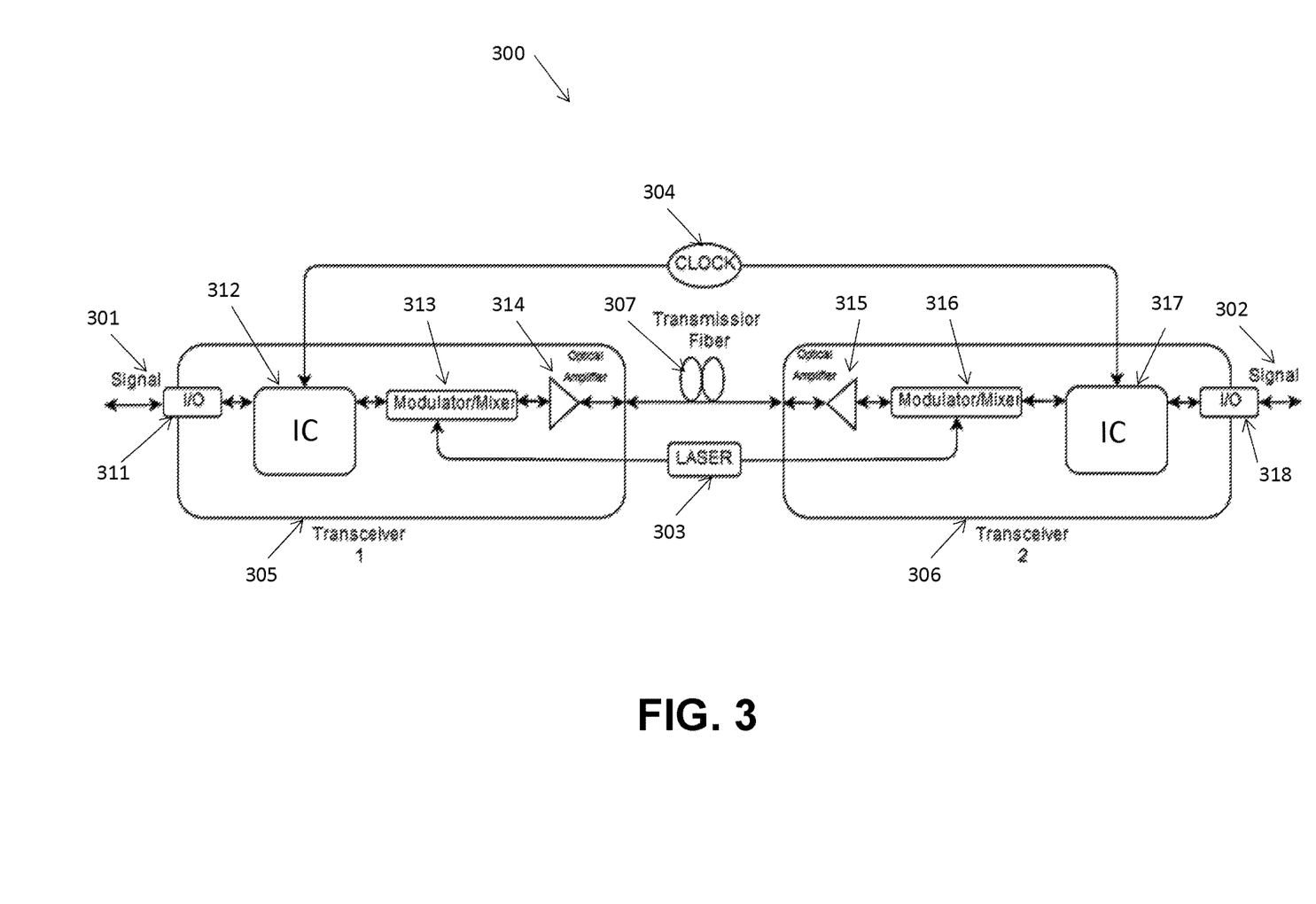
FIG. 3 is a schematic diagram of multiple transceivers sharing components in accordance with an exemplary embodiment of the present invention.

FIG. 3 is a schematic diagram of a system 300 comprising at least two substantially co-located transceivers 305, 306 sharing common components, such as a laser source 303 and/or a clock source 304, in accordance with an exemplary embodiment of the present invention. In embodiments, the substantially co-located transceivers 305, 306 may be coupled to each other by a transmission medium, such as a transmission fiber 307, as shown in FIG. 3. FIG. 3 shows an electromagnetic wave signal 301 traveling in to or out of a first transceiver 305 through a first input/output interface 311, and the corresponding electromagnetic wave signal 302 traveling in to or out of a second transceiver 306 through a second input/output interface 318. For example, the electromagnetic wave signal 301 enters the first transceiver 305 through the first input/output interface 311 and then passes through a first integrated circuit (IC) 312, a first modulator/mixer 313 and a first amplifier 314 of the first transceiver 305. The signal is then transmitted through the transmission fiber 307, and then passes through a second amplifier 315, a second modulator/mixer 316 and a second integrated circuit 317 of the second transceiver 306. The second transceiver 306 outputs the corresponding electromagnetic wave signal 302 through the second input/output interface 318. In alternative embodiments, the electromagnetic wave signal 302 may travel in the reverse direction such that the first transceiver 305 outputs the corresponding electromagnetic wave signal 301 through the first input/output interface 311.

At least two of the substantially co-located multiple transceivers 305, 306 may use a shared laser source 303. As shown in FIG. 3, the laser source 303 may be configured to provide a laser beam to the first transceiver 305 and to the second transceiver 306. In embodiments, if the first transceiver 305 is a transmit side and the second transceiver 306 is a receive side and each transceiver comprises one or more transmitters and one or more receivers, the laser source 303 may provide a laser beam to at least one of the one or more transmitters in the first transceiver 305 and to at least one of one or more receivers in the second transceiver 306. In embodiments, if the first transceiver 305 is a transmit side and the second transceiver 306 is a receive side and each transceiver comprises one or more transmitters and one or more receivers, the laser source 303 may provide a laser beam to a modulator 313 in at least one of the one or more transmitters in the first transceiver 305 and to a mixer 316 in at least one of one or more receivers in the second transceiver 306, as shown in FIG. 3. It should be noted that the pairs of transceivers that are sharing the laser sources will often transmit and receive light on the same wavelength.

In further embodiments, the laser source 303 may be configured to provide a laser beam to at least one of the one or more transmitters in at least one of the multiple transceivers 305, 306 and to at least one of the one or more receivers in the same one of the multiple transceivers 305, 306. In further embodiments, the laser source 303 may be configured to provide a laser beam to a modulator in at least one of the one or more transmitters in at least one of the multiple transceivers 305, 306 and to a mixer in at least one of the one or more receivers in the same one of the multiple transceivers 305, 306.

At least two of the substantially co-located multiple transceivers may use a shared clock source, which may be configured to provide a clock signal to each of at least two of the multiple transceivers. In embodiments, as shown in FIG. 3, a clock source 304 may be configured to provide a clock signal to the first IC 312 in the first transceiver 305 and to the second IC 317 in the second transceiver 306.

The use of shared components, such as laser sources and/or clock sources, by multiple transceivers leads to an efficient and cost-effective design by, for example, reducing the number of components used, decreasing the amount of digital signal processing used, reducing power consumption and lowering the capital and operating cost of manufacturing and maintaining the transceivers without affecting the performance of transmission.

While this invention has been described in conjunction with exemplary embodiments outlined above and illustrated in the drawings, it is evident that the principles of the present invention may be implemented using any number of techniques, whether currently known or not, and many alternatives, modifications and variations in form and detail will be apparent to those skilled in the art. Modifications, additions, or omissions may be made to the systems, apparatuses, and methods described herein without departing from the scope of the present invention. For example, the components of the systems and apparatuses may be integrated or separated. Furthermore, the operations of the systems and apparatuses disclosed herein may be performed by more, fewer, or other components and the methods described may include more, fewer, or other steps. Additionally, steps may be performed in any suitable order.

As defined herein, electromagnetic waves include acoustic waves. Accordingly, storage in motion of information or any kind of data can also be implemented using acoustic (i.e., sound) waves. Representative values for the speed of sound include about 1,500 m/sec in water, about 330 m/sec in air, and about 6,000 m/sec in steel. (There are a range of velocities for each case.) In terms of frequency, sound waves can be in the region of tens of MHz. For example, some medical ultrasound devices operate in the regions of tens of MHz. Usually, lower frequency sound also has less attenuation over distance.

A benefit of using acoustic waves for storage in motion is the relatively slower speed of sound. In this regard, if the wave signal carrying information or any kind of data in motion is an acoustic wave, the much lower speed of sound (as compared to the speed of light) enables one to store a greater amount of data in motion in a cavity without requiring a higher data rate at which the data is introduced into the cavity.

Acoustic waves require some medium in order to propagate. Information or any kind of data can be transmitted and/or reflected between structures or within structures using acoustic waves in various transmission media (e.g., air and steel, to name a few). Embodiments of storage in motion using acoustic waves could be constructed using such media. For steel, railroad tracks could be a long-distance medium. Acoustic waves can be generated using various sources of vibration, including crystal transducers and speakers, to name a few. Microphones detect acoustic waves. There is a significant base of acoustic technology in sound systems, in systems to eliminate vibration, and in systems to measure vibration. This device technology can be utilized in developing storage in motion systems using acoustic waves in accordance with the principles employed in the embodiments disclosed in the present application.

Accordingly, the exemplary embodiments of the invention, as set forth above, are intended to be illustrative, not limiting, and the spirit and scope of the present invention is to be construed broadly and limited only by the appended claims, and not by the foregoing specification.

In addition, unless otherwise specifically noted, articles depicted in the drawings are not necessarily drawn to scale.

What is claimed is:

1. A system comprising:
   a recirculating loop configured to store an electromagnetic wave signal, the recirculating loop comprising:
   a transmission medium; and
   a plurality of transceivers configured to introduce the electromagnetic wave signal into the transmission medium and retrieve the electromagnetic wave signal from the transmission medium; and
   a signal conditioning system comprising:
   a plurality of signal conditioners coupled to the transmission medium, the plurality of signal conditioners configured to amplify or regenerate the electromagnetic wave signal traveling in the transmission medium;

one or more pump laser sources, wherein at least one of the one or more pump laser sources is configured to provide a pump laser beam to at least two of the plurality of signal conditioners; and one or more control circuits for controlling the plurality of signal conditioners, wherein at least one of the one or more control circuits is configured to control at least two of the plurality of signal conditioners.

2. The system of claim 1, wherein the transmission medium comprises at least one of a waveguide, an optical fiber, or free space.

3. The system of claim 1, wherein the plurality of signal conditioners comprise amplifiers, regenerators, or a combination of amplifiers and regenerators.

4. The system of claim 3, wherein:
each of the amplifiers comprises a fiber amplifier doped with a gain medium; and
the gain medium comprises at least one of a fluorescent element, a rare-earth element, or erbium.

5. The system of claim 1, further comprising a coupler configured to combine the pump laser beam with the electromagnetic wave signal and send the combined beam/signal to a corresponding one of the plurality of signal conditioners.

6. The system of claim 1, wherein the at least one of the one or more control circuits comprises:
a photodetector configured to measure input and output optical powers of each of the at least two of the plurality of signal conditioners; and
a processor configured to compare the measured input and output optical powers and adjust an input pump laser power for the each of the at least two of the plurality of signal conditioners.

7. The system of claim 6, further comprising a variable attenuator coupled to the at least one of the one or more pump laser sources and to the at least one of the one or more control circuits, wherein the variable attenuator is configured to control the pump laser beam to be sent to a corresponding one of the plurality of signal conditioners based on the adjusted input pump laser power determined by the processor in the at least one of the one or more control circuits.

8. The system of claim 3, wherein the regenerators are configured to re-amplify, re-shape, or re-time the electromagnetic wave signal traveling in the transmission medium.

9. The system of claim 8, further comprising one or more clock sources, wherein at least one of the one or more clock sources is configured to provide a clock signal to at least two of the regenerators for re-timing the electromagnetic wave signal.

10. The system of claim 3, wherein:
the regenerators comprise crystals or optical fibers; and
the crystals or the optical fibers are doped with at least one of a fluorescent element, a rare-earth element, or erbium.

11. The system of claim 3, wherein the regenerators comprise at least one of all-optical regenerators; at least one amplifier and at least one absorber; at least one amplifier configured to operate in a saturation regime; or at least one nonlinear filter.

12. The system of claim 1, further comprising one or more laser sources, wherein at least one of the one or more laser sources is configured to provide a laser beam to at least two of the plurality of transceivers.

13. The system of claim 1, further comprising one or more laser sources, wherein:

each of the plurality of transceivers comprises one or more transmitters and one or more receivers; and
at least one of the one or more laser sources is configured to provide a laser beam to at least one of the one or more transmitters in one of the plurality of transceivers and to at least one of the one or more receivers in the other one of the plurality of transceivers.

14. The system of claim 1, further comprising one or more laser sources, wherein:
each of the plurality of transceivers comprises one or more transmitters and one or more receivers; and
at least one of the one or more laser sources is configured to provide a laser beam to at least one of the one or more transmitters in one of the plurality of transceivers and to at least one of the one or more receivers in the same one of the plurality of transceivers.

15. The system of claim 1, further comprising a single clock source configured to provide a clock signal to at least two of the plurality of transceivers.

16. The system of claim 13, wherein the at least one of the one or more laser sources provides the laser beam to a modulator in the at least one of the one or more transmitters in the one of the plurality of transceivers and to a mixer in the at least one of the one or more receivers in the other one of the plurality of transceivers.

17. The system of claim 14, wherein the at least one of the one or more laser sources provides the laser beam to a modulator in the at least one of the one or more transmitters in the one of the plurality of transceivers and to a mixer in the at least one of the one or more receivers in the same one of the plurality of transceivers.

18. The system of claim 15, wherein the single clock source provides the clock signal to an integrated circuit (IC) in each of the at least two of the plurality of transceivers.

19. The system of claim 1, wherein at least one of the plurality of transceivers or the plurality of signal conditioners is substantially co-located.

20. A system comprising:
a transmission medium;
a plurality of transceivers configured to introduce the electromagnetic wave signal into the transmission medium and retrieve the electromagnetic wave signal from the transmission medium; and
one or more laser sources, wherein at least one of the one or more laser sources is configured to provide a laser beam to at least two of the plurality of transceivers without providing the laser beams through the transmission medium.

21. The system of claim 20, wherein:
each of the plurality of transceivers comprises one or more transmitters and one or more receivers; and
the at least one of the one or more laser sources provides the laser beam to at least one of the one or more transmitters in one of the at least two of the plurality of transceivers and to at least one of the one or more receivers in the other one of the at least two of the plurality of transceivers.

22. The system of claim 20, wherein:
each of the plurality of transceivers comprises one or more transmitters and one or more receivers; and
at least one of the one or more laser sources is configured to provide a laser beam to at least one of the one or more transmitters in one of the plurality of transceivers and to at least one of the one or more receivers in the same one of the plurality of transceivers.

23. The system of claim 20, further comprising a single clock source configured to provide a clock signal to at least two of the plurality of transceivers.

24. The system of claim 21, wherein the at least one of the one or more laser sources provides the laser beam to a modulator in the at least one of the one or more transmitters in the one of the at least two of the plurality of transceivers and to a mixer in the at least one of the one or more receivers in the other one of the at least two of the plurality of transceivers.

25. The system of claim 22, wherein the at least one of the one or more laser sources provides the laser beam to a modulator in the at least one of the one or more transmitters in the one of the plurality of transceivers and to a mixer in the at least one of the one or more receivers in the same one of the plurality of transceivers.

26. The system of claim 23, wherein the single clock source provides the clock signal to an IC in each of the at least two of the plurality of transceivers.

27. The system of claim 20, wherein the transmission medium comprises at least one of a waveguide, an optical fiber, or free space.

28. The system of claim 20, wherein the transmission medium is configured to store an electromagnetic wave signal.

29. The system of claim 20, wherein the plurality of transceivers is substantially co-located.

30. A method for storing an electromagnetic wave signal in a transmission medium, the method comprising:
   amplifying or regenerating, using a plurality of signal conditioners coupled to the transmission medium, an electromagnetic signal traveling in the transmission medium;
   providing, from one or more pump laser sources, pump laser beams to the plurality of signal conditioners, wherein at least one of the one or more pump laser sources provides a pump laser beam to at least two of the plurality of signal conditioners; and
   controlling, using one or more control circuits, the plurality of signal conditioners, wherein at least one of the one or more control circuits controls at least two of the plurality of signal conditioners.

31. The method of claim 30, wherein the transmission medium comprises at least one of a waveguide, an optical fiber, or free space.

32. The method of claim 30, wherein the plurality of signal conditioners comprises amplifiers, regenerators, or a combination of amplifiers and regenerators.

33. The method of claim 32, wherein:
   each of the amplifiers comprises a fiber amplifier doped with a gain medium; and
   the gain medium comprises at least one of a fluorescent element, a rare-earth element, or erbium.

34. The method of claim 30, further comprising combining, using a coupler, the pump laser beam with the electromagnetic wave signal and sending, using the coupler, the combined beam/signal to a corresponding one of the plurality of signal conditioners.

35. The method of claim 30, wherein:
   the at least one of the one or more control circuits comprises a photodetector and a processor; and
   the controlling step comprises:
      measuring, using the photodetector, input and output optical powers of each of the at least two of the plurality of signal conditioners; and
      comparing, using the processor, the measured input and output optical powers to adjust an input pump laser power for the each of the at least two of the plurality of signal conditioners.

36. The method of claim 35, further comprising controlling, using a variable attenuator coupled to the at least one of the one or more pump laser sources and to the at least one of the one or more control circuits, the pump laser beam to be sent to a corresponding one of the plurality of signal conditioners based on the adjusted input pump laser power determined by the comparing step.

37. The method of claim 32, wherein the regenerating step comprises re-amplifying, re-shaping, or re-timing, using the regenerators, the electromagnetic wave signal traveling in the transmission medium.

38. The method of claim 37, wherein the re-timing step comprises providing, using one or more clock sources, clock signals to the regenerators, wherein at least one of the one or more clock sources provides a clock signal to at least two of the regenerators.

39. The method of claim 30, wherein the regenerating step is performed all optically in an optical domain.

40. A method of using a plurality of transceivers connected to a transmission medium, the method comprising:
   inputting, using the plurality of transceivers, an electromagnetic wave signal into the transmission medium;
   outputting, using the plurality of transceivers, the electromagnetic wave signal from the transmission medium; and
   providing, from a single laser source, a laser beam to at least two of the plurality of transceivers without providing the laser beams through the transmission medium.

41. The method of claim 40, wherein:
   each of the plurality of transceivers comprises one or more transmitters and one or more receivers; and
   the single laser source provides the laser beam to at least one of the one or more transmitters in one of the at least two of the plurality of transceivers and to at least one of the one or more receivers in the other one of the at least two of the plurality of transceivers.

42. The method of claim 40, wherein each of the plurality of transceivers comprises one or more transmitters and one or more receivers, the method further comprising the step of providing, from the single laser source, a laser beam to at least one of the one or more transmitters in one of the plurality of transceivers and to at least one of the one or more receivers in the same one of the plurality of transceivers.

43. The method of claim 40, further comprising providing, from a single clock source, a clock signal to at least two of the one or more transceivers.

44. The method of claim 41, wherein the single laser source provides the laser beam to a modulator in the at least one of the one or more transmitters in the one of the at least two of the plurality of transceivers and to a mixer in the at least one of the one or more receivers in the other one of the at least two of the plurality of transceivers.

45. The method of claim 42, wherein the single laser source provides the laser beam to a modulator in the at least one of the one or more transmitters in the one of the plurality of transceivers and to a mixer in the at least one of the one or more receivers in the same one of the plurality of transceivers.

46. The method of claim 43, wherein the single clock source provides the clock signal to an IC in each of the at least two of the plurality of transceivers.

47. The method of claim 40, wherein the transmission medium comprises at least one of a waveguide, an optical fiber, or free space.

48. The method of claim 40, wherein the transmission medium is configured to store an electromagnetic wave signal.

49. The system of claim 1, further comprising at least one of one or more multiplexers, wherein at least one of the one or more multiplexers is communicably coupled to at least two of the plurality of signal conditioners, or one or more demultiplexers, wherein at least one of the one or more demultiplexers is communicably coupled to at least two of the plurality of signal conditioners.

50. The method of claim 30, wherein the amplifying or regenerating step comprises at least one of using one or more multiplexers, wherein at least one of the one or more multiplexers is communicably coupled to at least two of the plurality of signal conditioners, or using one or more demultiplexers, wherein at least one of the one or more demultiplexers is communicably coupled to at least two of the plurality of signal conditioners.

\* \* \* \* \*